(12) United States Patent
Rooney (10) Patent No.: US 7,096,904 B2
(45) Date of Patent: Aug. 29, 2006

(54) OFF ROAD TIRE HAVING VARIABLE WIDTH PUNCTURE PREVENTING PADS

(75) Inventor: Timothy Michael Rooney, Munroe Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 251 days.

(21) Appl. No.: 10/329,623

(22) Filed: Dec. 26, 2002

(65) Prior Publication Data

US 2004/0123926 A1 Jul. 1, 2004

(51) Int. Cl.
 B60C 11/11 (2006.01)
(52) U.S. Cl. ............... 152/209.12; 152/209.15; 152/209.19; 152/209.28
(58) Field of Classification Search ............ 152/209.12, 152/209.13, 209.15, 209.19, 209.28, DIG. 1, 152/209.16, 209.24; D12/504, 544, 900
See application file for complete search history.

(56) References Cited

U.S. PATENT DOCUMENTS

| D168,494 | S | | 12/1952 | Beckman |
| 4,186,788 | A | * | 2/1980 | Pommier ............... 152/209.12 |
| 4,446,902 | A | | 5/1984 | Madec et al. |
| 4,687,037 | A | | 8/1987 | Pfeiffer et al. |
| 4,711,283 | A | | 12/1987 | Bonko et al. |
| D308,038 | S | | 5/1990 | Guidry |
| D323,135 | S | * | 1/1992 | Thomas ................. D12/504 |
| 5,131,443 | A | * | 7/1992 | Kuhr et al. ............ 152/209.19 |
| 5,160,385 | A | * | 11/1992 | Goto et al. ............ 152/209.19 |
| 5,259,429 | A | | 11/1993 | Harms |
| 5,375,639 | A | | 12/1994 | Suzuki et al. |
| 5,375,640 | A | | 12/1994 | Harms |
| 5,417,269 | A | | 5/1995 | Kinoshita et al. |
| 5,714,021 | A | * | 2/1998 | Ochi ..................... 152/209.15 |
| 6,021,829 | A | | 2/2000 | Rooney |
| 6,189,586 | B1 | * | 2/2001 | Guidry ................. 152/209.15 |
| 6,206,064 | B1 | * | 3/2001 | Takahashi ............. 152/209.24 |
| 6,401,774 | B1 | | 6/2002 | Rooney |
| 6,601,624 | B1 | * | 8/2003 | Ratliff, Jr. ............. 152/209.19 |

FOREIGN PATENT DOCUMENTS

| FR | 1.163.341 | | 12/1956 |
| FR | 1.236.335 | | 6/1971 |
| FR | 2.201.193 | | 9/1972 |
| GB | 2021049 A | | 11/1979 |
| JP | 55-119505 | * | 9/1980 |
| JP | 358152604 A | | 9/1983 |
| JP | 5-286310 | * | 11/1993 |
| JP | 410119516 A | | 5/1998 |
| JP | 2000-318407 | * | 11/2000 |
| WO | WO 01/25029 | * | 4/2001 |

OTHER PUBLICATIONS

Shontz, BFGoodrich Mud-Terrain T/A KM, ROCKCRAWLER. com, three pages, 2001.*

* cited by examiner

Primary Examiner—Steven D. Maki
(74) Attorney, Agent, or Firm—Thompson Hine LLP (57) ABSTRACT

This invention relates to off-road tires, more specifically off-road tires for use with all-terrain vehicles, agricultural equipment, and construction equipment. A plurality of elongated pads are interposed between circumferentially adjacent lugs, preventing damage to the tire's inner tread without impeding the soil shedding characteristics of the tire's soil discharge channels. The width of the puncture prevention pads may vary to compensate for the greater spacing between circumferentially adjacent lugs at the shoulder region of the tire.

13 Claims, 7 Drawing Sheets

FIG-11   FIG-12

US 7,096,904 B2

OFF ROAD TIRE HAVING VARIABLE WIDTH PUNCTURE PREVENTING PADS

FIELD

This invention relates to off-road tires, more specifically, a preferred embodiment of this invention relates to a pneumatic all-terrain vehicle tire.

BACKGROUND OF THE INVENTION

As used in this patent the term "off-road" tires means pneumatic tires that have a primary use or working surface condition that is not on a paved road. Such tires include construction equipment tires, agricultural tires, lawn and garden tires, and all-terrain vehicle tires, including, but not limited to off-road dirt bike tires and ATV tires. Of particular interest are tires that have low operating pressures and minimal belt reinforcements. For example, ATV tires generally operate at less than 10 pounds per square inch ("psi") of pressure and often have no belt reinforcing structure.

All-terrain vehicles are relatively lightweight with a relatively low center of gravity. Early three wheel versions had knobby tires having small square block elements and a relatively shallow tread depth. Later versions of "quad runners" or 4-wheel type ATV's were developed and have been more widely accepted due to their improved stability. Horsepower increases and improvements in both vehicle suspension and chassis has resulted in vehicles capable of relatively high speed and much greater load carrying capacity.

As previously noted, the tires used on all-terrain vehicles are operated at very low pressures, in the range of 10 psi (0.7 bar) or less. The tires are very wide with relatively large air chambers, which assist in absorbing shock and vibration. The tires generally have nominal rim diameters of 14 inches (36 centimeters) or less and overall diameters of 28 inches (72 centimeters) or less. Often the rear tires are of a slightly larger size than the more lightly loaded front tires.

In aggressive off-road applications, ATV tires must have a very open tread pattern that employs elongated members called "lugs" which provide effective straight-line or "drawbar" traction to enable the vehicle to climb hilly and rough terrain, as shown in U.S. Design Pat. No. D308,038, issued to Guidry. Additionally, the tread must provide excellent lateral traction for vehicle stability during turning maneuvers as is disclosed in Harms U.S. Pat. No. 5,259,429. The tire disclosed by Harms employs a repeating pattern of long, intermediate length and short lugs arranged to provide improved traction. The arrangement of these lugs is such that each lug wraps completely over the tread shoulder region. The lugs are also circumferentially relatively closely spaced such that numerous lugs are in the footprint of the tire at any one time. The tire made according to this prior art invention is considered one of the best mud tires in its class according to its manufacturer.

The space between circumferentially adjacent lugs of an off-road tire is commonly referred to as a "soil discharge channel." The soil discharge channels extend generally from the equatorial plane of the tread axially outwardly over the edge of the tread, called the "tread shoulder." The channels are designed to shed mud which accumulates in the channels, aided by gravity and centrifugal force generated by the rotating tire. In wet soils with heavy clay content there is a tendency for the tread of an off-road tire to pack with mud between the elongated lugs. If the soil discharge channels are packed with mud, the tread effectively loses its ability to provide any traction. This is because the lugs are buried in the packed mud, giving the tire the appearance of a slick or racing tread devoid of grooves.

For the very reasons off-road tires have such good traction capabilities, they exhibit a relatively high potential for damage in the area of the inner tread surface. The inner tread surface lies between the tread lugs and is relatively thin in comparison to the lugs, rendering it vulnerable to sharp objects, such as rocks, sticks, thorns, stubble, and roots. The sharp objects are able to penetrate the inner tread surface, damaging the tire and causing it to deflate. A partial solution to this problem is disclosed in Rooney U.S. Pat. No. 6,401,774 wherein elongated pads are located on the inner tread surface to protect the tire from sharp objects. However, tires utilizing the elongated pads as taught by Rooney are still subject to damage in the tread shoulder area due to the larger spacing between adjacent lugs at the tread shoulder. The larger spacing between shoulder lugs is sometimes required to improve tread cleaning. When the spacing between lugs increases, the pressure on the soil trapped between the lugs decreases. Because the lugs in the center of the tire footprint are closer together than the shoulder lugs, the pressure on the soil is higher at the center of the footprint than at the shoulder. Thus, the soil is pushed from the center of the footprint to the edges of the footprint by this pressure differential. This allows the soil to move faster through the tire footprint and prevents the tire from packing up. There is a need for a means to protect the tread shoulder area of an off-road tire from damage due to sharp objects. There is a further need to provide this damage protection without compromising the tire's ability to discharge soil and maintain traction.

It is an object of the present invention to minimize tire damage, especially in the tire shoulder area, without increasing tire weight or losing tire performance. A further objective of the present invention is to provide protection from tire damage without compromising the tire's ability to discharge soil and maintain traction.

SUMMARY

An off-road tire having a casing and a tread radially outward of the casing is disclosed. The tread has an inner tread and a plurality of circumferentially adjacent lugs extending radially outward from the inner tread. The tread also has a plurality of elongated pads wherein each elongated pad is oriented in a direction substantially parallel to the centerlines of the circumferentially adjacent lugs. Each pad has a base width Z as measured from the inner tread and a radial height X also being measured from the inner tread. Z is at least three times greater than X. Each longitudinal side of the pads has a slope of 30° or less as measured with respect to the inner tread surface, preferably about 20° or less. The radial height X may vary based on the spacing of circumferentially adjacent lugs. A radial height of 0.2 inches (5 millimeters) or less is preferred for ATV applications. The width Z of the pads may be varied by adjusting the slope of the longitudinal sides. For example, where there is a substantial circumferential space between adjacent lugs, such as at the tire shoulder, the width Z of the pads may be increased by reducing the slope of the longitudinal sides. The elongated pads each have a pair of tapered ends. The tapered ends are inclined at an angle of about 45° or less relative to the inner tread surface.

In a preferred embodiment the tire utilizes a tread wherein the lugs are arrays arranged in a repeating directional pattern. The arrays are arranged in rows around the circumference of the tread. A first array of lugs extends angularly from an axially inner end adjacent the equatorial plane of the tread toward a first lateral edge, terminating at an axially outer end. A second array of tread lugs extends angularly from an axially inner end adjacent the equatorial plane of the tread towards the second lateral edge, terminating at an axially outer end. The space between each pair of first or second circumferentially adjacent arrays of lugs defines a soil discharge channel. An elongated pad is located within the soil discharge channel and interposed between each pair of circumferentially adjacent arrays. The elongated pad is inclined in a direction similar to the inclination of the pairs of respective arrays.

Preferably the elongated pad interposed between circumferentially adjacent pairs of arrays is located a substantially equal distance between centerlines of adjacent arrays. It is believed desirable that the elongated pads have a length "L" of at least 35% of the tread are width. Preferably the elongated pad extends from an axially inner end adjacent the equatorial plane outward to a lateral end covering substantially all of the soil discharge channel's length. The width of the pad may vary by varying the slope of the longitudinal sides as the pad extends laterally to the tread shoulder area.

DEFINITIONS

"Agricultural Equipment" means any type of equipment used in association with farm and ranching operations, such as tractors.

"All-terrain Vehicle" ("ATV") is any motorized off-highway vehicle 50 inches (1270 millimeters) or less in overall width, with an unladen dry weight of 600 pounds (275 kilograms) or less, designed to travel on four or more low pressure tires, having a seat designed to be straddled by the operator and handlebars for steering control, and intended for use by a single operator and no passenger. Width and weight shall be exclusive of accessories and optional equipment. ATV's are subdivided into four categories as follows:

Category G, General Use Model ATV: An ATV intended for general recreational and utility use;

Category S, Sport Model ATV: An ATV intended for recreational use by experienced operators only.

Category U, Utility Model ATV: An ATV intended primarily for utility use.

Category Y, Youth Model ATV: An ATV intended for recreational off-road use under adult supervision by operators under age 16. Youth model ATV's can further be categorized as follows:

Category Y-6 ATV: A Category Y-6 ATV is a youth model ATV which is intended for use by children age 6 and older.

Category Y-12 ATV: A Category Y-12 ATV is a youth model ATV which is intended for use by children age 12 and older.

"Aspect Ratio" means the ratio of the section height of an object to its section width.

"Axial" and "axially" means the lines or directions that are parallel to the axis of rotation of the tire.

"Belt or Breaker Structure" or "Reinforcing Belts or Breakers" means at least two annular layers or plies of parallel cords, woven or unwoven, underlying the tread, unanchored to the bead, and having both left and right cord angles in the range from 17° to 35° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components, excluding the tread and any belt reinforcements; these additional components may be added to the carcass prior to its being vulcanized to create the molded tire.

"Casing" means the carcass, belt structure, beads, sidewalls and all other components of the tire excepting the tread and undertread.

"Construction Equipment" means any type of equipment used in association with construction and civil engineering, such as skid-steer loaders and earthmoving equipment.

"Equatorial Plane" ("EP") means the plane perpendicular to the tire's axis of rotation and passing through the center of its tread.

"Inner" means toward the inside of the tire with reference to the tire's equatorial plane.

"Outer" means toward the tire's exterior with reference to the tire's equatorial plane.

"Pneumatic tire" means a laminated mechanical device of generally toroidal shape, usually an open-torus having beads and a tread and made of rubber, chemicals, fabric and steel or other materials. When mounted on the wheel of a motor vehicle, the tire through its tread provides traction and contains the fluid that sustains the vehicle load.

"Radial" and "radially" mean directions toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" ("SH") means the radial distance from the nominal rim diameter to the outer diameter of the tire at its equatorial plane.

"Section Width" ("SW") means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Tread" means a molded rubber component which when, bonded to a tire casing, includes that portion of the tire that Comes into contact with the road when the tire is normally inflated and under normal load.

"Tread Width or Tread Arc Width" means the arc length of the tread surface in the axial direction, that is, in a plane parallel to the axis of rotation of the tire.

DESCRIPTION OF THE PREFERRED EMBODIMENT(S)

Figure 1:
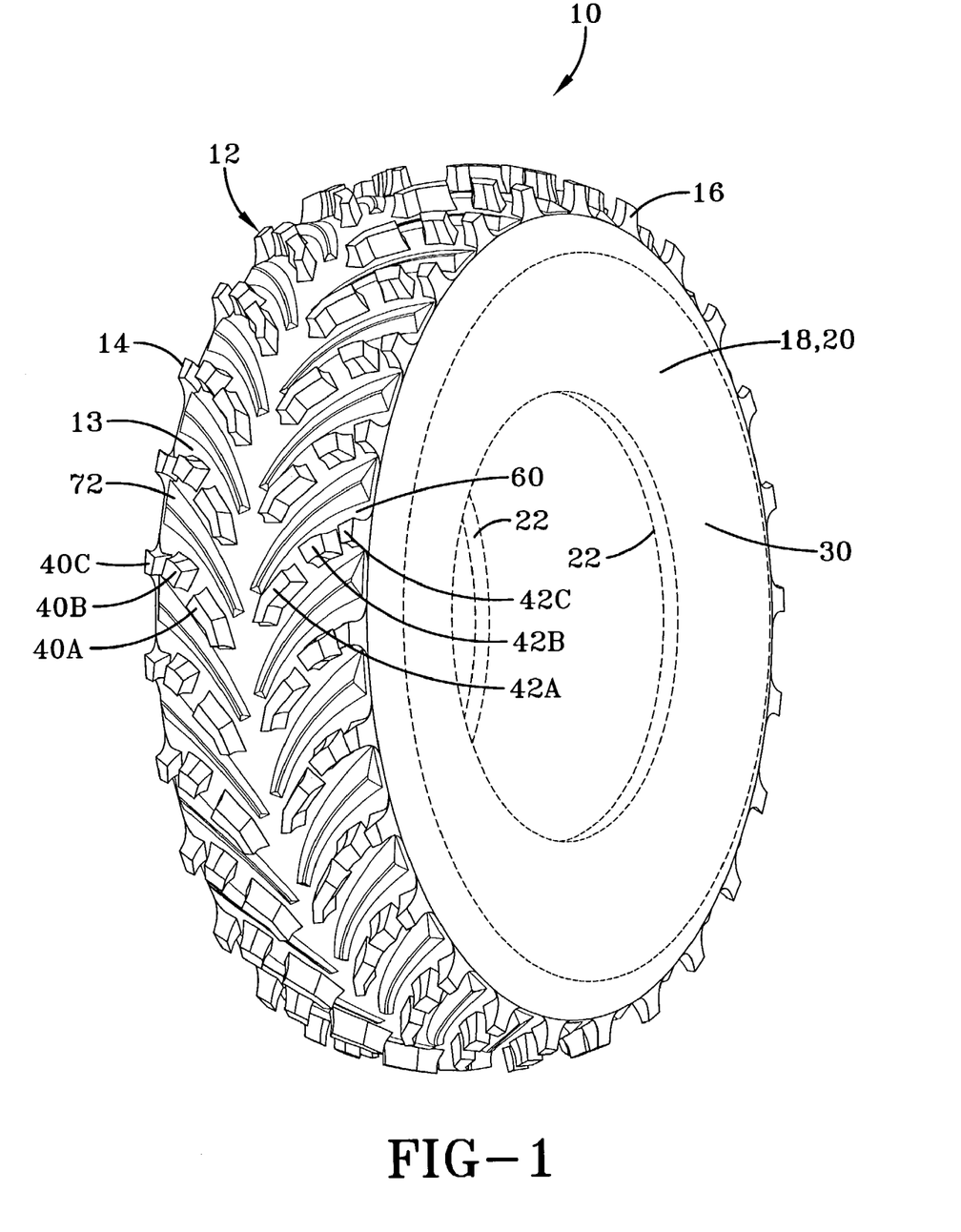
FIG. 1 is a perspective view of an ATV tire according to a preferred embodiment of the present invention.
Figure 2:
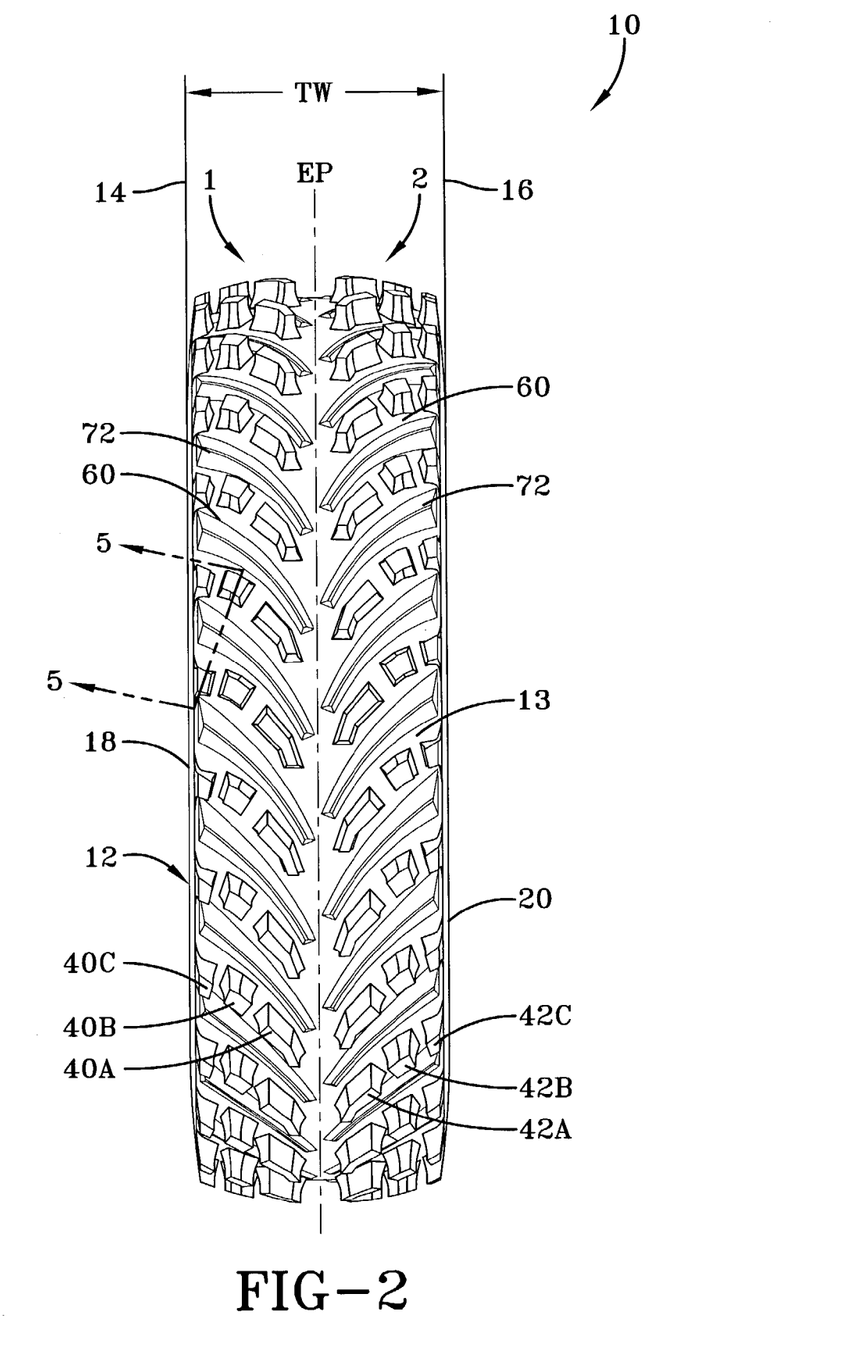
FIG. 2 is a plan view of the tire of FIG. 1.
Figure 3:
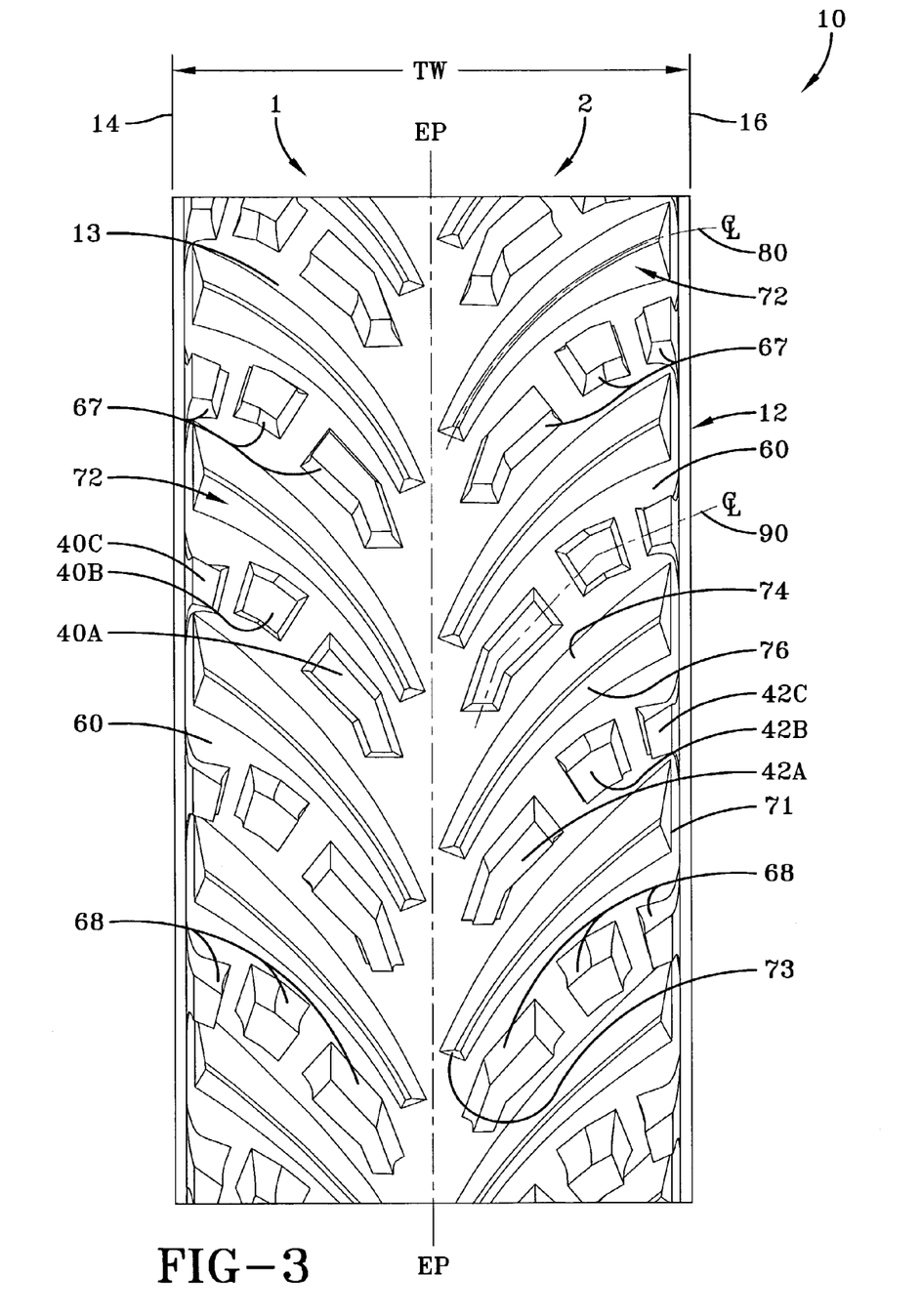
FIG. 3 is an enlarged fragmentary view of the tire of FIG. 1.

With reference to FIGS. 1–3, an off-road tire 10 according to an embodiment of the present invention is illustrated. The tire 10 shown is an ATV tire which has a nominal rim diameter of 14 inches (36 centimeters) or less; a carcass 30, and a tread 12 disposed radially outward of the carcass. The tread 12 has an inner tread 13 and a plurality of elongated lug arrays 40,42, each lug array 40,42 having an axially inner portion 40A,42A, an axially central portion 40B,42B, and an axially outer portion 40C,42C extending radially outward of the inner tread 13. The tire 10 is provided with a ground-engaging tread portion 12, which terminates in the shoulder regions at the lateral edges 14,16 of the tread 12. A sidewall portion 18,20 extends from tread lateral edges 14,16 respectively and terminates in a pair of bead regions 22.

Referring to FIG. 3, an enlarged fragmentary portion of the tread 12 is shown. The lateral edges 14,16 are defined as planes perpendicular to the tire axis of rotation R and intersecting the axially outermost portions of the elongated lug arrays 40,42 in the shoulder regions. The distance between the lateral edges defines the tread arc width and the tread width ("TW"). The distance halfway between the lateral edges is the equatorial plane ("EP") of the tire 10. The tread 12 has elongated lug arrays 40,42 extending radially outward from the inner tread 13. Each lug array 40,42 has a leading edge 67 and a trailing edge 68. Preferably, the leading and trailing edges are curved.

The lug arrays 40,42 are arranged into two circumferentially repeating rows 1,2. The first and second rows 1,2 extend laterally outwardly from the center of the tread 12 to a respective tread lateral edge 14,16. The first row preferably is circumferentially offset relative to the second row.

The volumetric space above the inner tread 13 between the circumferentially adjacent lug arrays 40,42 of the first and second rows 1,2, form soil discharge channels 60 extending from the central portion of the tread 12 axially outwardly to a tread shoulder.

With reference to FIGS. 1–5 in combination, elongated pads 72 are shown extending radially outwardly from the inner tread 13. Each elongated pad 72 has a curved centerline 80. Each elongated pad 72 extends from substantially an equatorial plane (EP) of the tread 12 to substantially a shoulder region of the tire 10. Each elongated pad 72 is located within a soil discharge channel 60 and lies between a pair of circumferentially adjacent lugs or arrays of lugs 40,42. As can be seen, the elongated pads traverse almost the entire length of the discharge channel 60. Lug portions 40A,40B, and 40C may be considered an array of lugs oriented in a directional pattern and inclined relative to the equatorial plane. Likewise, lug portions 42A,42B, and 42C may be considered an array of lugs oriented in a directional pattern and inclined relative to the equatorial plane. The elongated pads 72 are oriented in a direction similar to a pair of arrays as illustrated in FIG. 3. The elongated pad has a centerline 80. The centerline 90 of the array is substantially parallel to the centerline of the elongated pad. As further shown, the elongated pad 72 is approximately positioned an equal distance from each circumferentially adjacent array of lugs. It is believed important that the elongated pad 72 have a length that is sufficient to extend almost completely across the soil discharge channel 60 as it extends outward over the tread shoulder. This insures that the elongated pad 72 provides sufficient puncture protection from sharp objects in the entire footprint area of the tread 12 as the tire 10 rotates. Each pad 72 preferably has taper ends 71, 73, inclined at an angle of 45° or less, preferably 30° or less.

Figure 4:
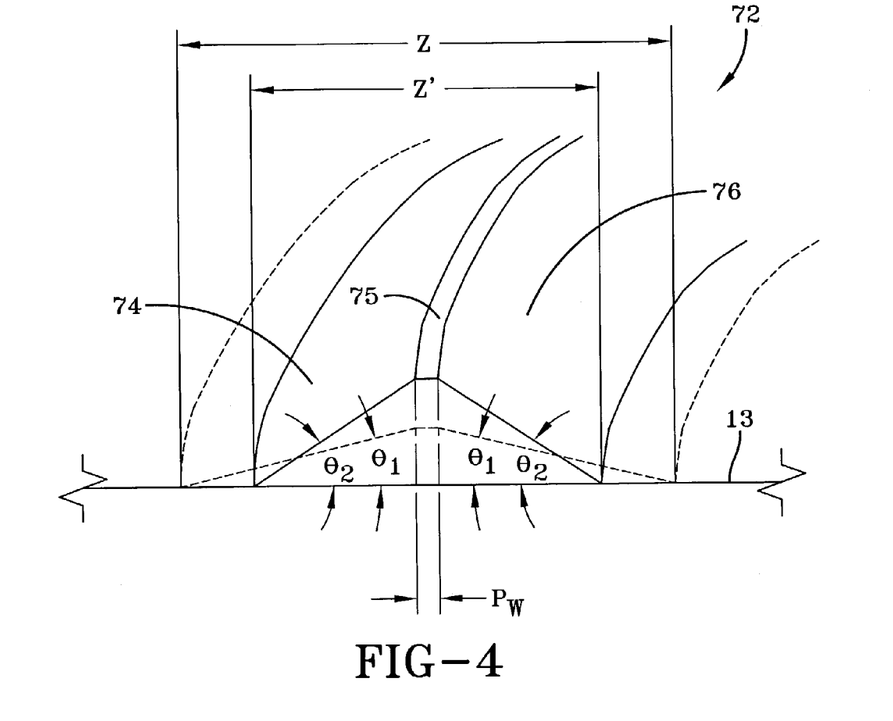
FIG. 4 is an end view of an elongated pad.

A detailed view of the elongated pad 72 is shown in FIG. 4. The longitudinal sides 74, 76 of the elongated pad 72 are sloped at an angle θ of 30° or less relative to the inner tread 13. It is believed preferable that the sloped longitudinal sides 74,76 are inclined at an angle θ of 20° or less to insure that the stubble debris is easily deflected outward and does not hang up on the elongated pad. The 20° or less sloped longitudinal sides 74,76 of the elongated pads 72 also allow the elongated pad to be very wide and thus protect a larger section of the tire undertread 13 located between tread lug arrays 40,42. If desired, the slope of the longitudinal sides 74,76 may vary along the length of the elongated pad 72 such that the angle θ is greater near the equatorial plane EP of the tire 10 and less as the elongated pad extends to the lateral edges 14,16 of the tread 12. The base width Z of the elongated pads 72 may be varied by varying the slope of the longitudinal sides, 74,76, controlled by the angle θ. A smaller angle $θ_1$ will result in a larger-base width Z, while a greater angle $θ_2$ will result in a narrower base width Z'. The base width Z is varied as desired to provide protection for the inner tread 13. In a preferred embodiment the elongated pads 72 may extend from an equatorial plane EP of the tire to a shoulder region of the tire at the interface of the lateral edges 14,16 and the sidewall portions 18,20, such that the base width Z of each elongated pad is narrowest near the equatorial plane of the tire and becomes wider near the shoulder region of the tire. The elongated pads 72 can terminate at a point at the top forming a line along the entire length of the elongated pads. Alternatively, the elongated pads 72 can have a radially shaped outer surface 75 forming a plane along the length "L" (not shown) of the elongated pads. The radially shaped outer surface 75 is preferably a maximum width $P_w$ of 0.20 inches (5 millimeters) or less so as not to inhibit the deflection capability of the elongated pad 72. Referring again to FIG. 2, the width of the elongated pads 72 increases at the shoulder region of the tire, affording the inner tread 13 greater protection in the shoulder region. The width of the elongated pad 72 is preferably greater in the shoulder region because the spacing between circumferentially adjacent lug arrays 40,42 is greater in the shoulder region, resulting in greater exposure of the inner tread 13.

Figure 5:
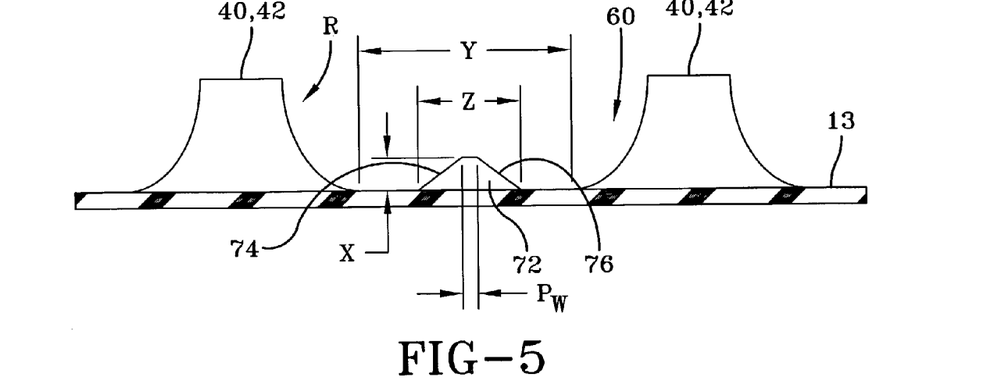
FIG. 5 is a cross-sectional view of a soil discharge channel.

With reference to FIG. 5, a cross-sectional view of the elongated pad 72 is shown interposed between circumferentially adjacent lug arrays. Each elongated pad 72 has a base width Z as measured from the inner tread 13 and a radial height X as measured relative to the inner tread 13. The elongated pad 72 preferably has a base width Z being at least three times, preferably six times greater than the radial height X. The radial height X may vary based on the spacing of circumferentially adjacent lug arrays. For example, the radial height X of the elongated pads may vary from a first height at an equatorial plane of the tire to a second height at a shoulder region. The radial height X of each elongated pad is always less than a radial height of the circumferentially adjacent lug arrays. It is believed desirable that the radial height X should be less than two-tenths of an inch (5 mm). This insures that the elongated pad 72 is sufficiently low so as not to adversely impact the soil discharge capability of the tread 12. In ATV tires it has been found that as low as a 0.1 inch or 2.5 mm height X is sufficient to dramatically reduce stubble damage. By utilizing dimensions preferably as shallow as 0.2 inches (5 mm) it has been determined that no additional tread rubber is needed to form these elongated pads 72 in each soil discharge channel 60. This is made possible by a molding technique wherein uncured tread rubber is applied to the outside of the carcass 30 during the stage of the vulcanization process where the tread lug arrays 40,42 and the inner tread surface 13 are formed. It has been found that the inner tread surface 13 has a higher thickness of tread rubber trapped between the adjacent lug arrays 40,42, causing a nonuniform undertread thickness. This excess rubber is repositioned with regard to the tires of the present invention such that the excess rubber now forms the elongated pads 72, creating a beneficial effect that otherwise heretofore was unavailable for ATV, agricultural, and construction equipment tires.

As can be seen in FIG. 5, the sides of the lug arrays 40,42 have a generous radius R as the lugs approach the inner tread surface 13. This radius R is considered the bracing of the tread lug and has been used to prevent cracks along the inner surface 13 as well as to further facilitate molding. This radius R creates a sufficiently large mass of rubber near the base of each lug such that penetration of stubble is minimal adjacent these braced lugs. It is noted that a similar increase in rubber mass has occurred at the inner tread 13 in the center where the elongated pad 72 is strategically positioned. The total width of the elongated pad 72 should occupy at least 50% of Y, which is the distance between the lug radii R. The elongated pad 72 may extend the entire distance Y between the lug arrays 40,42, if desired. This increase in rubber mass with the sloping longitudinal sides 74,76 helps deflect debris that impinges on the tire surface so that the debris cannot penetrate through the inner tread surface 13. As mentioned above, the elongated pads 72 also place the excess rubber between lug arrays 40,42 in the most advantageous locations to prevent punctures and abrasions. In the past stone penetration protectors have been used in the basic grooves of truck tires and the like to prevent stones from impinging or being trapped between closely spaced lugs and to prevent these trapped stones from drilling their way through the inner tread of a truck tire. In the case of the ATV tires, it is important that these elongated pads are employed to prevent debris such as roots, sticks, thorns, rocks or other sharp objects from penetrating through the relatively thin undertread of the tire. As noted, the elongated pads are oriented at an angular inclination similar to the orientation of the lugs thus lying within the soil discharge channel and being substantially parallel to the centerlines of the lugs. This insures that as the soil and debris flows outwardly over the elongated pads 72 between adjacent lugs, the elongated pads 72 themselves will create no obstruction to the flow of the soil/debris over the tread. The small radial height of these elongated pads also insures that circumferential soil flow is not obstructed. In many prior art tires, small shallow buttons are used as debris deflectors. The small buttons have a tendency to snag branches, thorns and roots and provide a place to introduce a location for penetration. This is true because the small perturbances are not sufficiently sloped such that the debris easily deflects over them. Rather they are designed with sufficiently tall surfaces with inadequate sloping such that they actually block the debris from freely traversing over the penetration protectors. These conical buttons also prevent the soil from flowing freely through the discharge channel, causing lug clogging and resultant loss of traction. In one prior art farm tire, small transverse debris-deflecting protrusions are located between adjacent lugs. These features are oriented so that they do not lie in the same direction as the flow path as the soil being transmitted over the tread shoulders. As a result, they provide additional edges to snag debris. The elongated pads 72 of the present invention being shaped and oriented as described herein provides a most beneficial feature at virtually no cost to the end user.

Figure 6:
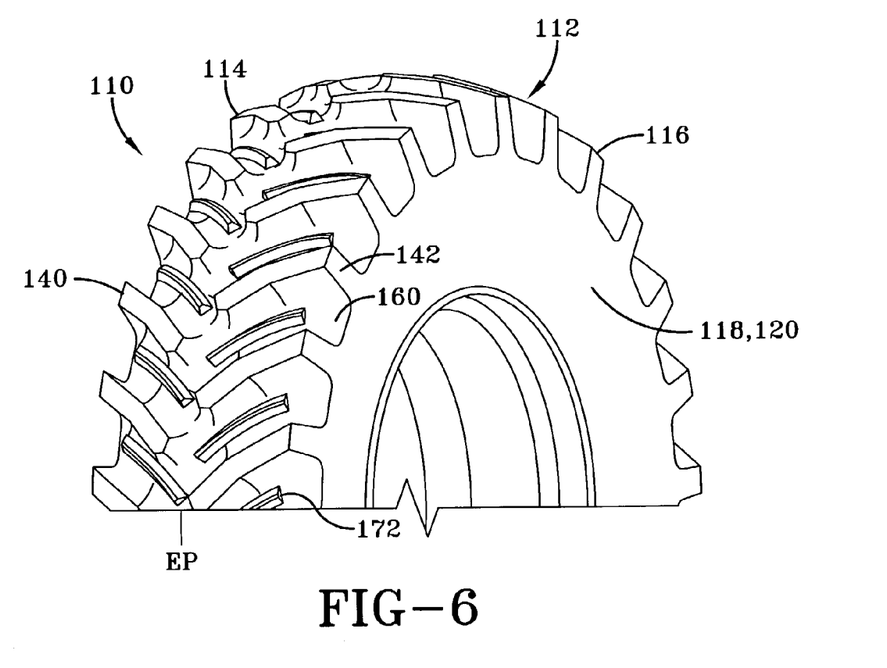
FIG. 6 is a perspective view of a tire for use with agricultural or construction equipment according to an alternate embodiment of the present invention.

FIG. 6 shows an alternate embodiment of the present invention wherein elongated pads 172 are formed on a tread 112 of a tire 110 for use with agricultural or construction equipment. The elongated pads 172 are located in soil discharge channels 160 formed in the spaces between an array of circumferentially adjacent lugs 140,142. The elongated pads 172 may be narrower near the equatorial plane EP, and become wider at a shoulder region of the tire at the interface of a pair of lateral edges 114, 116 of a tread 112 and a set of sidewalls 118,120.

Figure 7:
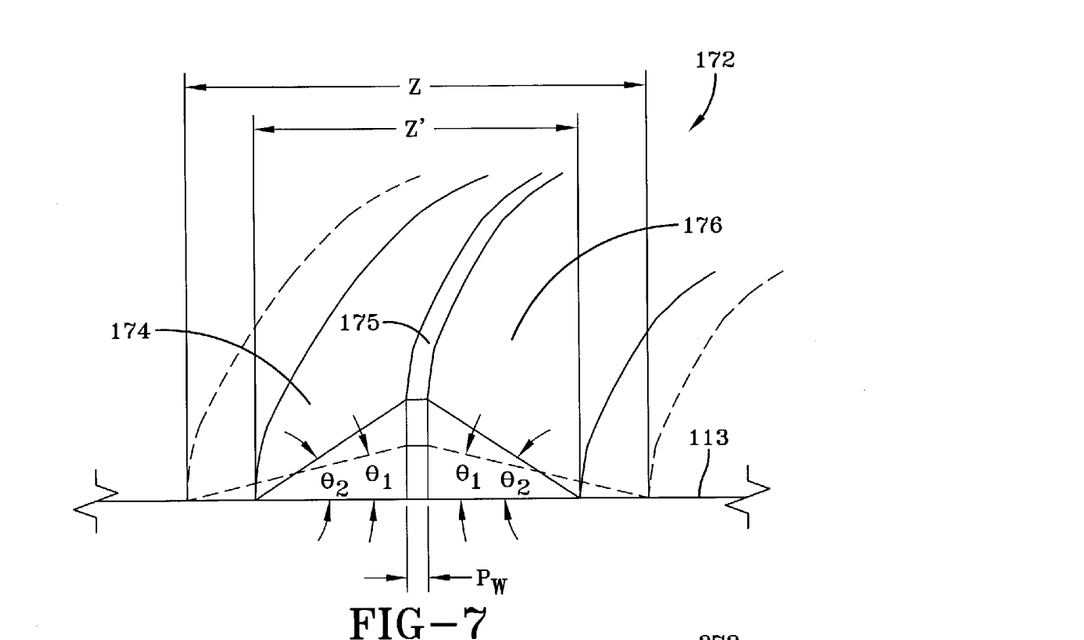
FIG. 7 is an end view of the elongated pad of FIG. 6.

With reference to FIG. 7, the base width Z of the elongated pads 172 may be varied by varying the slope of the longitudinal sides 174,176, controlled by the angle θ. A smaller angle $θ_1$ will result in a larger base width Z, while a greater angle $θ_2$ will result in a narrower base width Z'. The base width Z is varied as desired to provide protection for the inner tread 113. The elongated pads 172 can terminate at a point at the top forming a line along the entire length of the elongated pads. Alternatively, the elongated pads 172 can have a radially shaped outer surface 175 forming a plane along the length of the elongated pads. The radially shaped outer surface 175 is preferably a maximum width $P_w$ of 0.20 inches (5 millimeters) or less so as not to inhibit the deflection capability of the elongated pad 172. Each elongated pad 172 preferably has taper ends 171, 173 (not shown), inclined at an angle of 450° or less, preferably 30° or less.

Figure 8:
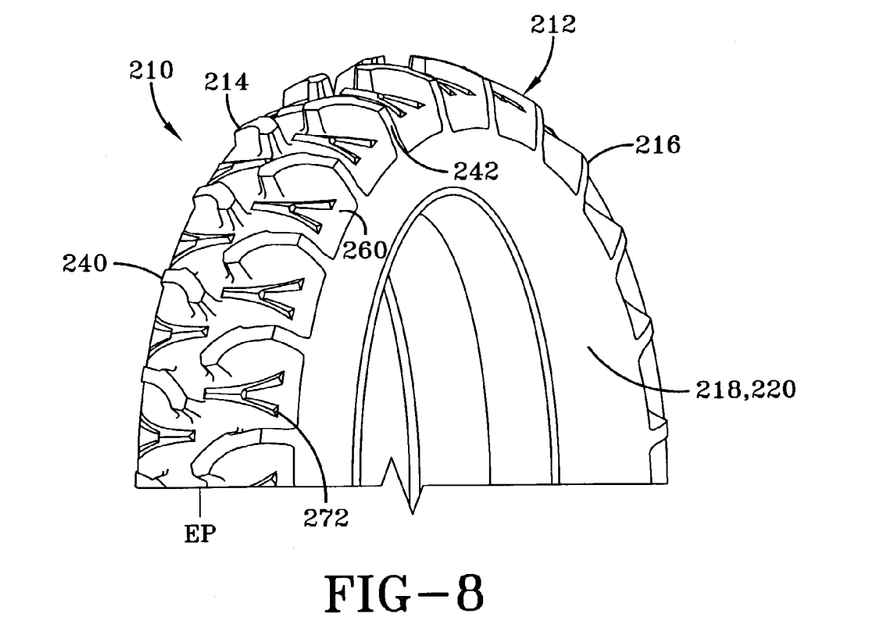
FIG. 8 is a perspective view of a tire for use with agricultural or construction equipment according to another alternate embodiment of the present invention.
Figure 9:
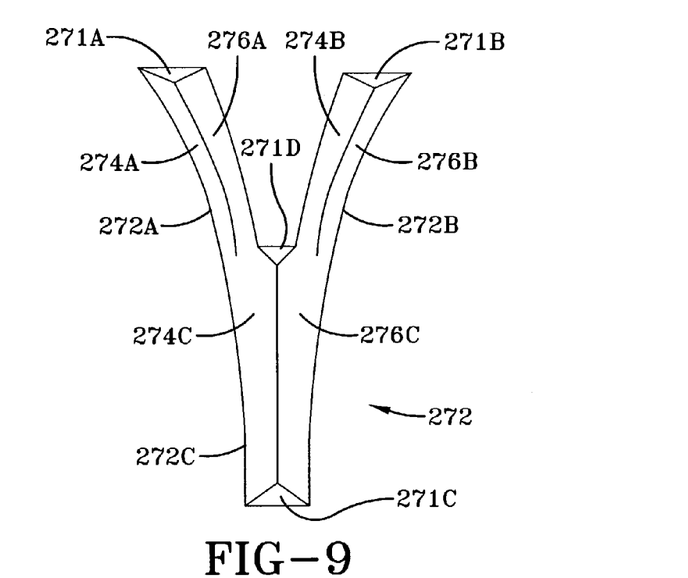
FIG. 9 is a plan view of a "Y"-shaped elongated pad.
Figure 10:
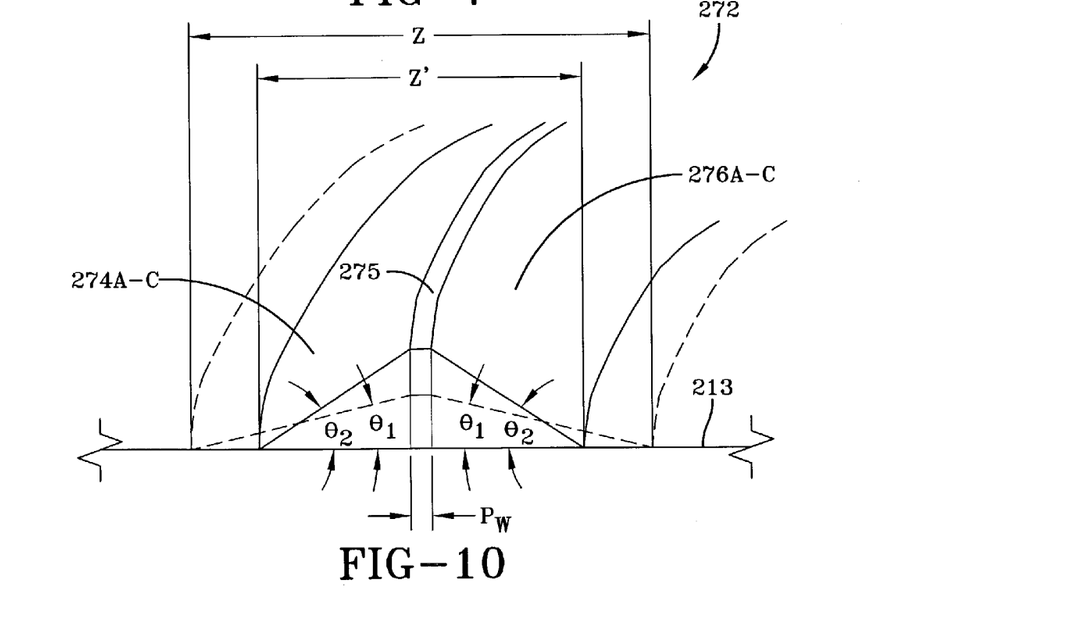
FIG. 10 is an end view of the "Y"-shaped elongated pad of FIG. 9.

FIG. 8 shows yet another alternate embodiment of the present invention wherein elongated pads 272 are formed on a tread 212 of a tire 210 for use with agricultural or construction equipment. In this embodiment the elongated pads 272 are "Y"-shaped to afford greater protection of a shoulder region of the tire at the interface of a pair of lateral edges 214, 216 of a tread 212 and a set of sidewalls 218,220. In a preferred embodiment the elongated pads 272 are arranged such that the bifurcated portion of the elongated pads are located at the shoulder region of the tire. With continued reference to FIG. 8 and with reference to an expanded view of the elongated pads 272 in FIG. 9, the width of the legs 272A, 272B, and 272C may be varied as desired to provide adequate protection for the inner tread 213 by varying the slope of the longitudinal sides 274A–C, 276A–C. Each elongated pad 272 preferably has taper ends 271A–D, inclined at an angle of 45° or less, preferably 30° or less. An end view of the elongated pads 272 is shown in FIG. 10. The base width Z of the elongated pads 272A–C may be varied by varying the slope of the longitudinal sides 274,276, controlled by the angle θ. A smaller angle $θ_1$ will result in a larger base width Z, while a greater angle $θ_2$ will result in a narrower base width Z'. The base width Z is varied as desired to provide adequate protection for the inner tread 213. The elongated pads 272 can terminate at a point at the top forming a line along the entire length of the elongated pads. Alternatively, the elongated pads 272 can have a radially shaped outer surface 275 forming a plane along the length of the elongated pads. The radially shaped outer surface 275 is preferably a maximum width $P_w$ of 0.20 inches (5 mm) or less so as not to inhibit the deflection capability of the elongated pad 272.

Figure 11:
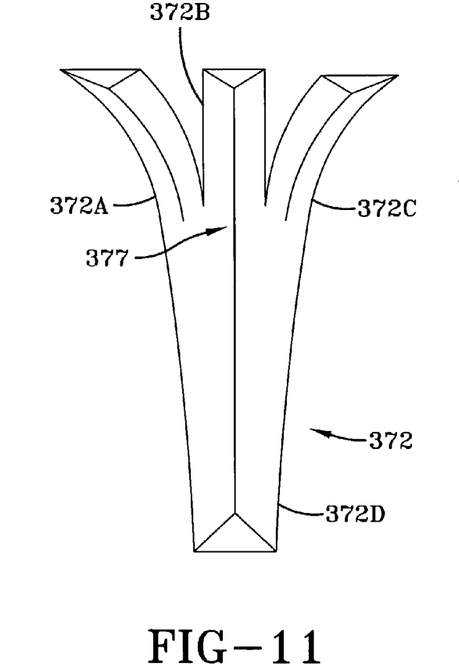
FIG. 11 is a plan view of yet another alternate embodiment of the present invention.
Figure 12:
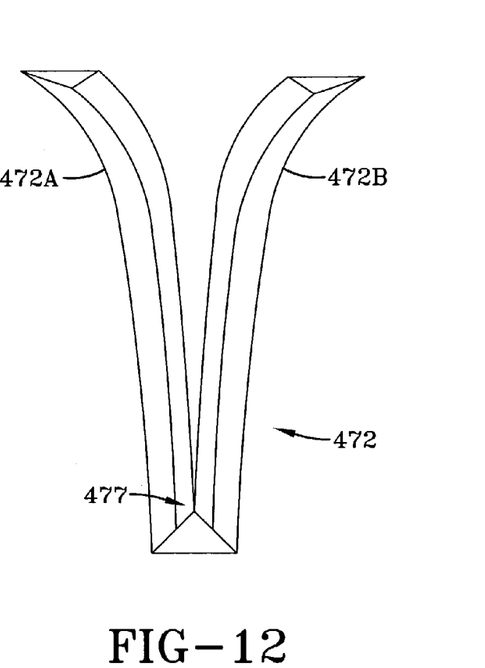
FIG. 12 is a plan view of still another alternate embodiment of the present invention.

It should be noted that the elongated pads may take on a number of forms without departing from the scope of the present invention. For example, the elongated pads may comprise a plurality of legs as shown generally in FIG. 11. In this example an elongated pad 372 is comprised of legs 372A–D. The legs 372A–D may be shaped as previously described for elongated pad 272. Any number of legs could be added to the embodiment of 372, joining at a common region 377. Similarly, the elongated pads may be generally "V" shaped as shown in FIG. 12. In this example an elongated pad 472 is comprised of two legs 472A, 472B joined at a common region 477. The legs 472A, 472B may be shaped as previously described for elongated pad 272. In a preferred embodiment the elongated pad 472 may comprise a plurality of legs 472A–B radiating from a common region 477 and arranged such that the common region is located near the equatorial plane (EP) of the tire and the legs 472A–B are located at the shoulder region of the tire. Any number of legs could be added to the embodiment of 472, joining together at common region 477.

In a first expression of an embodiment of the invention, the off-road tire 210 has a casing and a tread 212 radially outward of the casing, wherein the tread 212 has an inner tread 213 and a plurality of lug arrays 240 and 242 extending radially outwardly from the inner tread 213. The tread 212 comprises a plurality of elongated pads 272, each elongated pad 272 being placed between, and spaced apart from, circumferentially adjacent lug arrays 240 and 242 and oriented in a direction substantially parallel to the centerlines of the circumferentially adjacent lug arrays 240 and 242. Each elongated pad 272 has at least two longitudinal sides, a base width Z as measured from the inner tread 213 and a radial height X, the base width Z being varied to cover and protect the inner tread 213. Each elongated pad 272 has a curved centerline, wherein each elongated pad 272 extends from substantially an equatorial plane (EP) of the tread 212 to substantially a shoulder region of the tire 210, wherein the base width Z of each elongated pad continuously increases from substantially the equatorial plane (EP) of the tread 212 to substantially the shoulder region of the tire 210, and wherein only one elongated pad 272 is placed between each pair of circumferentially adjacent lug arrays 240 and 242. The radial height X of each elongated pad 272 is always less than a radial height of the circumferentially adjacent lug arrays 240 and 242, and the elongated pads 272 are "Y"-shaped and are arranged such that the bifurcated portion of the elongated pads 272 are located at the shoulder region of the tire 210.

In a second expression of an embodiment of the invention, the off-road tire 210 has a casing and a tread 212 radially outward of the casing, wherein the tread 212 has an inner tread 213 and a plurality of lug arrays 240 and 242 extending radially outwardly from the inner tread 213. The tread 212 comprises a plurality of elongated pads 272, each elongated pad 272 being placed between, and spaced apart from, circumferentially adjacent lug arrays 240 and 242 and oriented in a direction substantially parallel to the centerlines of the circumferentially adjacent lug arrays 240 and 242. Each elongated pad 272 has at least two longitudinal sides, a base width Z as measured from the inner tread 213 and a radial height X, the base width Z being varied to cover and protect the inner tread 213. Each elongated pad 272 has a curved centerline, wherein each elongated pad 272 extends from substantially an equatorial plane (EP) of the tread 212 to substantially a shoulder region of the tire 210, wherein the base width Z of each elongated pad continuously increases from substantially the equatorial plane (EP) of the tread 212 to substantially the shoulder region of the tire 210, and wherein only one elongated pad 272 is placed between each pair of circumferentially adjacent lug arrays 240 and 242. The radial height X of each elongated pad 272 is always less than a radial height of the circumferentially adjacent lug arrays 240 and 242, and the elongated pads 272 comprise a plurality of legs 272A and 272B radiating from a common region and are arranged such that the common region is located near the equatorial plane of the tire 210 and the legs 272A and 272B are located at the shoulder region of the tire.

What is claimed is:

1. An off-road tire having a casing and a tread radially outward of the casing, the tread has an inner tread and a plurality of lug arrays extending radially outwardly from the inner tread, the tread comprises:

a plurality of elongated pads, each elongated pad spaced apart from each lug array, each elongated pad being placed between circumferentially adjacent lug arrays and oriented in a direction substantially parallel to the centerlines of the circumferentially adjacent lug arrays, each elongated pad having at least two longitudinal sides, a base width Z as measured from the inner tread and a radial height X, the base width Z being varied to cover and protect the inner tread, wherein each elongated pad has a curved centerline, wherein the base width Z of each elongated pad is widest at the outermost portion of the pad, wherein each elongated pad is spaced apart from circumferentially adjacent lug arrays at the innermost portion of the pad, wherein each of at least two longitudinal sides of each elongated pad intersect the inner tread along a curved line, wherein each elongated pad has a length L of at least 35% of the tread arc width, and wherein the radial height X of each elongated pad is always less than a radial height of the circumferentially adjacent lug arrays.

2. An off-road tire having a casing and a tread radially outward of the casing, the tread has an inner tread and a plurality of lug arrays extending radially outwardly from the inner tread, the tread comprises:

a plurality of elongated pads, each elongated pad spaced apart from each lug array, each elongated pad being placed between circumferentially adjacent lug arrays and oriented in a direction substantially parallel to the centerlines of the circumferentially adjacent lug arrays, each elongated pad having at least two longitudinal sides, a base width Z as measured from the inner tread and a radial height X, the base width Z being varied to cover and protect the inner tread, wherein each elongated pad has a curved centerline, wherein each elongated pad extends from substantially an equatorial plane (EP) of the tread to substantially a shoulder region of the tire, wherein the base width Z of each elongated pad continuously increases from substantially the equatorial plane (EP) of the tread to substantially the shoulder region of the tire, wherein only one elongated pad is placed between each pair of circumferentially adjacent lug arrays, and wherein the radial height X of each elongated pad is always less than a radial height of the circumferentially adjacent lug arrays.

3. The off-road tire of claim 2 wherein the elongated pads each have a pair of tapered ends extending across the longitudinal sides, the tapered ends being inclined at an angle of 45° or less relative to the inner tread.

4. The off-road tire of claim 2 wherein the elongated pad interposed between circumferentially adjacent pairs of arrays is located a substantially equal distance between centerlines of circumferentially adjacent arrays.

5. The off-road tire of claim 2 wherein the total width of the elongated pad occupies at least 50% of the distance between the circumferentially adjacent lug arrays.

6. The off-road tire of claim 2 wherein the base width Z of the elongated pads is varied by varying the slope of the longitudinal sides with respect to the inner tread.

7. The off-road tire of claim 2 wherein the radial height X of the elongated pads varies from a first height at an equatorial plane of the tire to a second height at a shoulder region of the tire.

8. The off-road tire of claim 2 wherein the equatorial plane (EP) of the tread is spaced apart from each elongated pad and each lug array.

9. An off-road tire having a casing and a tread radially outward of the casing, the tread has an inner tread and a plurality of lug arrays extending radially outwardly from the inner tread, the tread comprises:

a plurality of elongated pads, each elongated pad being placed between, and spaced apart from, circumferentially adjacent lug arrays and oriented in a direction substantially parallel to the centerlines of the circumferentially adjacent lug arrays, each elongated pad having at least two longitudinal sides, a base width Z as measured from the inner tread and a radial height X, the base width Z being varied to cover and protect the inner tread, wherein each elongated pad has a curved centerline, wherein each elongated pad extends from substantially an equatorial plane (EP) of the tread to substantially a shoulder region of the tire, wherein the base width Z of each elongated pad continuously increases from substantially the equatorial plane (EP) of the tread to substantially the shoulder region of the tire, wherein only one elongated pad is placed between each pair of circumferentially adjacent lug arrays, and wherein each elongated pad has a pair of longitudinal sides, each longitudinal side having a slope of 30° or less as measured from the inner tread surface.

10. The off-road tire of claim 9 wherein the longitudinal sides are sloped at an angle of 20° or less.

11. The off-road tire of claim 9 wherein each elongated pad has a radially shaped outer surface interposed between the pair of sloped longitudinal sides.

12. An off-road tire having a casing and a tread radially outward of the casing, the tread has an inner tread and a plurality of lug arrays extending radially outwardly from the inner tread, the tread comprises:

a plurality of elongated pads, each elongated pad being placed between, and spaced apart from, circumferentially adjacent lug arrays and oriented in a direction substantially parallel to the centerlines of the circumferentially adjacent lug arrays, each elongated pad having at least two longitudinal sides, a base width Z as measured from the inner tread and a radial height X, the base width Z being varied to cover and protect the inner tread, wherein each elongated pad has a curved centerline, wherein each elongated pad extends from substantially an equatorial plane (EP) of the tread to substantially a shoulder region of the tire, wherein the base width Z of each elongated pad continuously increases from substantially the eciuatorial plane (EP) of the tread to substantially the shoulder region of the tire, wherein only one elongated pad is placed between each pair of circumferentially adjacent lug arrays, wherein the radial height X of each elongated pad is always less than a radial height of the circumferentially adjacent lug arrays, and wherein the elongated pads are "Y"-shaped and are arranged such that the bifurcated portion of the elongated pads are located at the shoulder region of the tire.

13. An off road tire having a casing and a tread radially outward of the casing, the tread has an inner tread and a plurality of lug arrays extending radially outwardly from the inner tread, the tread comprises:

a plurality of elongated pads, each elongated pad being placed between, and spaced apart from, circumferentially adjacent lug arrays and oriented in a direction substantially parallel to the centerlines of the circumferentially adjacent lug arrays, each elongated pad having at least two longitudinal sides, a base width Z as measured from the inner tread and a radial height X, the base width Z being varied to cover and protect the inner tread, wherein each elongated pad has a curved centerline, wherein each elongated pad extends from substantially an equatorial plane (EP) of the tread to substantially a shoulder region of the tire, wherein the base width Z of each elongated pad continuously increases from substantially the eciuatorial plane (EP) of the tread to substantially the shoulder region of the tire, wherein only one elongated pad is placed between each pair of circumferentially adjacent lug arrays, wherein the radial height X of each elongated pad is always less than a radial height of the circumferentially adjacent lug arrays, and wherein the elongated pads comprise a plurality of legs radiating from a common region and are arranged such that the common region is located near the equatorial plane of the tire and the legs are located at the shoulder region of the tire.

* * * * *

UNITED STATES PATENT AND TRADEMARK OFFICE
CERTIFICATE OF CORRECTION

PATENT NO. : 7,096,904 B2 Page 1 of 1
APPLICATION NO. : 10/329623
DATED : August 29, 2006
INVENTOR(S) : Timothy M. Rooney It is certified that error appears in the above-identified patent and that said Letters Patent is hereby corrected as shown below:

Col. 12

Line 17, Change "eciuatorial" to -- equatorial --.

Line 28, Change "off road" to -- off-road --.

Line 46, "eciuatorial" to -- equatorial --.

Signed and Sealed this

Twenty-sixth Day of December, 2006

JON W. DUDAS
*Director of the United States Patent and Trademark Office*